United States Patent [19]

Coleman

[11] Patent Number: 5,673,930
[45] Date of Patent: Oct. 7, 1997

[54] VEHICLE OCCUPANT PROTECTION APPARATUS

[75] Inventor: Daniel E. Coleman, Mesa, Ariz.

[73] Assignee: TRW Inc., Lyndhurst, Ohio

[21] Appl. No.: 701,026

[22] Filed: Aug. 21, 1996

[51] Int. Cl.$^6$ ................................................ B60R 21/22
[52] U.S. Cl. ........................ 280/728.2; 280/728.1
[58] Field of Search ........................... 280/728.2, 731, 280/732, 743.1, 728.1

[56] References Cited

U.S. PATENT DOCUMENTS

| | | | |
|---|---|---|---|
| 4,111,457 | 9/1978 | Kob et al. | 280/728.1 |
| 4,793,631 | 12/1988 | Takada | 280/743.1 |
| 4,943,027 | 7/1990 | Nakayama | 248/548 |
| 5,064,218 | 11/1991 | Hartmeyer | 280/743.1 |
| 5,121,941 | 6/1992 | Mihm et al. | 280/732 |
| 5,176,400 | 1/1993 | McGuire et al. | 280/728.1 |
| 5,195,774 | 3/1993 | Morita | 280/731 |
| 5,308,107 | 5/1994 | Watanabe et al. | 280/728.2 |
| 5,382,046 | 1/1995 | Cuevas | 280/728.2 |
| 5,419,584 | 5/1995 | Halford | 280/728.2 |
| 5,560,644 | 10/1996 | Fiore | 280/728.2 |

FOREIGN PATENT DOCUMENTS

2272189  5/1994  United Kingdom.

*Primary Examiner*—Christopher P. Ellis
*Attorney, Agent, or Firm*—Tarolli, Sundheim, Covell, Tummino & Szabo

[57] ABSTRACT

A vehicle occupant protection apparatus (10) includes a retainer structure (60), a reaction structure (26), and an inflatable vehicle occupant protection device (14) having a portion (100) clamped between the retainer structure (60) and the reaction structure (26). The apparatus (10) further includes a deflectable structure (80). The deflectable structure (80) deflects under the influence of an inflation fluid pressure force to enable limited movement of the clamped portion (100) of the protection device (14) between the retainer structure (60) and the reaction structure (26) under the influence of the pressure force.

13 Claims, 5 Drawing Sheets

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a collision sensor and an inflator. The collision sensor senses vehicle conditions that indicate the occurrence of a collision. When the collision sensor senses a collision-indicating condition of at least a predetermined threshold level, the inflator is actuated. The inflator then emits inflation fluid which inflates the air bag into the vehicle occupant compartment to help protect an occupant of the vehicle from forcefully striking, or being struck by, parts of the vehicle as a result of the collision.

An air bag and an inflator are typically assembled together as parts of an air bag module which is separate from the collision sensor. The air bag module is located in the vehicle adjacent to the vehicle occupant compartment. For example, a driver's side air bag module may be located on the vehicle steering column. A passenger side air bag module may be located in the vehicle instrument panel.

In addition to the air bag and the inflator, an air bag module typically includes a reaction structure, a retainer structure, and a cover. The reaction structure supports the inflator. The retainer structure surrounds the inflator. An edge portion of the air bag also surrounds the inflator, and is clamped between the retainer structure and the reaction structure. The cover includes at least one deployment door which extends directly over the air bag to conceal the air bag and the other parts of the module from the vehicle occupant compartment.

When the inflation fluid emitted from the inflator begins to inflate the air bag, it moves the air bag forcefully outward against the deployment door on the cover. The cover is ruptured by the force of the fluid pressure acting on the air bag. The deployment door is then moved pivotally out of the path of the air bag as the inflation fluid continues to inflate the air bag outward from the cover and into the vehicle occupant compartment. In addition to rupturing the cover, the force of the fluid pressure tends to pull the edge portion of the air bag outward from between the retainer structure and the reaction structure.

SUMMARY OF THE INVENTION

In accordance with the present invention, an apparatus comprises a retainer structure, a reaction structure, and an inflatable vehicle occupant protection device. A portion of the protection device is clamped between the retainer structure and the reaction structure.

The apparatus further comprises means for deflecting under the influence of an inflation fluid pressure force. The deflecting means enables limited movement of the clamped portion of the protection device between the retainer structure and the reaction structure under the influence of the pressure force.

In a first embodiment of the present invention, the retainer structure is a circular retainer ring, and the reaction structure is a reaction plate. The deflecting means in the first embodiment is a ring-shaped cushion which adjoins the clamped portion of the protection device between the retainer ring and the reaction plate.

In a second embodiment of the present invention, the retainer structure comprises a rectangular retainer frame. The reaction structure in the second embodiment is a reaction canister with a rectangular, frame-shaped wall portion. The deflecting means is a cushion which also is shaped as a rectangular frame. The cushion adjoins the clamped portion of the protection device between the retainer frame and the rectangular wall portion of the reaction canister.

In each embodiment of the present invention, the clamped portion of the protection device transmits an inflation fluid pressure force to the deflecting means. The deflecting means deflects adjacent to the clamped portion of the protection device under the influence of the pressure force. Such deflection enables the clamped portion of the protection device to move a corresponding amount under the influence of the pressure force. The deflecting means thus protects the protection device from being damaged by the pressure force.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
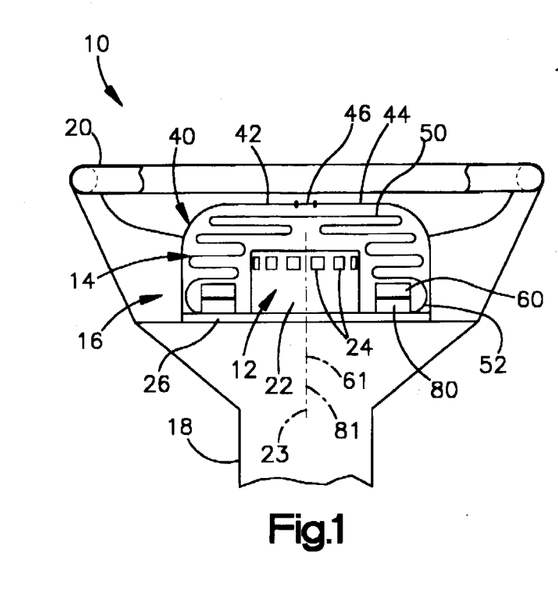
FIG. 1 is a schematic view of a vehicle occupant protection apparatus comprising a first embodiment of the present invention.
Figures 2, 3:
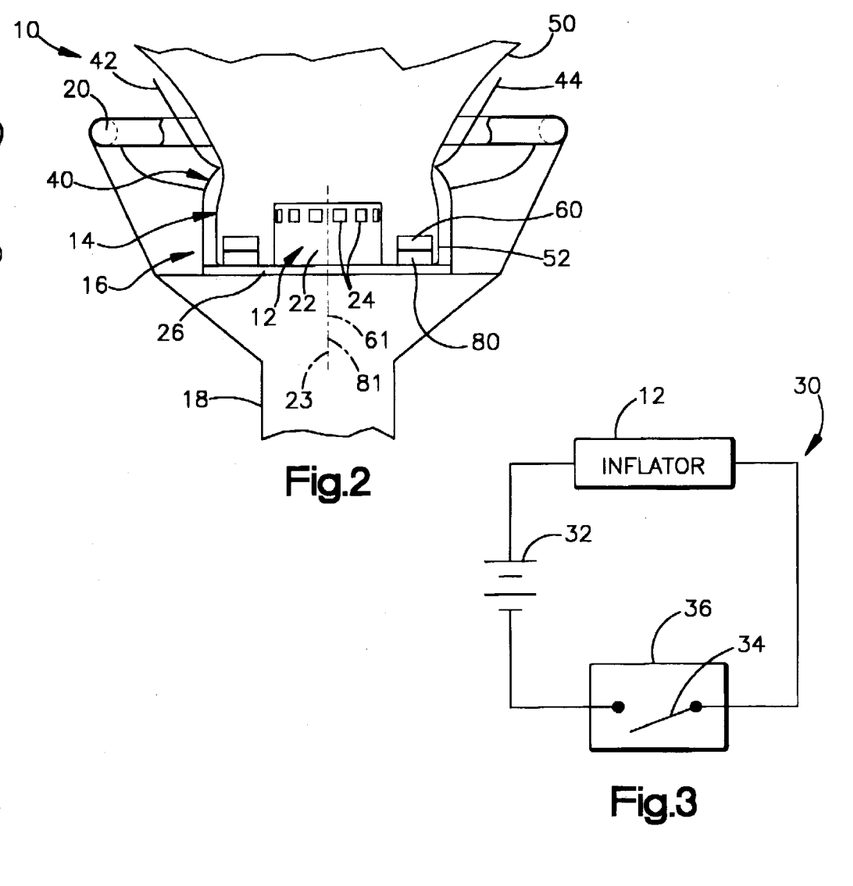
FIG. 2 is a view showing the apparatus of FIG. 1 in an actuated condition.
FIG. 3 is a schematic view of an electrical circuit including parts of the apparatus of FIG. 1.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is commonly referred to as an air bag. Other inflatable vehicle occupant protection devices that can be used in accordance with the present invention include inflatable seat belts, inflatable knee bolsters, inflatable head liners, and knee bolsters operated by inflatable air bags.

In the first embodiment of the present invention, the air bag 14 and the inflator 12 are parts of an air bag module 16 which is mounted on a vehicle steering column 18 near the center of the steering wheel 20. The air bag 14 is inflatable from a folded, uninflated condition, as shown in FIG. 1, to an unfolded, inflated condition, as shown in FIG. 2. When the air bag 14 is being inflated, it moves toward the driver of the vehicle. The air bag 14 then restrains movement of the driver toward the steering wheel 20 to help protect the driver from a forceful impact with the steering wheel 20 or other parts of the vehicle.

The inflator 12 comprises a source of inflation fluid for inflating the air bag 14. As known in the art, the inflator 12 may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid.

As shown schematically in FIGS. 1 and 2, the inflator 12 in the first embodiment has a cylindrical housing 22 with a central axis 23 and a circumferentially extending array of inflation fluid outlet openings 24. The inflator housing 22 is mounted on a reaction plate 26 in a known manner. The reaction plate 26 may have any structure that is suitable for supporting the inflator housing 22 on the steering column 18. Accordingly, the reaction plate 26 may define the hub of the steering wheel 20, or may be mounted on another part (not shown) which defines the hub of the steering wheel 20, as known in the art.

The inflator 12 is included in an electrical circuit 30 (FIG. 3) with a power source 32 and a normally open switch 34. The power source 32 is preferably the vehicle battery and/or a capacitor. The switch 34 is part of a sensor 36 which senses a vehicle condition indicating the occurrence of a vehicle collision. Such a condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 14 is desired to restrain movement of the driver of the vehicle, as described above. The switch 34 then closes, and electric current is directed through the inflator 12 to actuate the inflator 12. As a result, the inflator 12 rapidly emits a large volume of inflation fluid which flows into the air bag 14 to inflate the air bag 14.

A cover 40 encloses the air bag 14 and the inflator 12. The cover 40 is made of a pliable plastic material which may have any suitable composition known in the art. The cover 40 includes first and second deployment door panels 42 and 44 which extend over the air bag 14. The deployment door panels 42 and 44 are held in closed positions, as shown in FIG. 1, by a rupturable section 46 of the cover 40. As the inflation fluid emitted from the inflator 12 begins to inflate the air bag 14, it moves the air bag 14 forcefully outward against the cover 40. The force of the inflation fluid pressure acting on the air bag 14 ruptures the rupturable section 46 of the cover 40 and moves the deployment door panels 42 and 44 pivotally outward, as shown in FIG. 2. As the inflation fluid continues to inflate the air bag 14, it moves the air bag 14 outward from the cover 40 past the deployment door panels 42 and 44. The structure of the cover 40, including the number and arrangement of deployment door panels and rupturable sections, can vary from the example shown schematically in the drawings.

The air bag 14 has a body 50 and a mouth 52. When the air bag 14 is being inflated from the condition of FIG. 1 to the condition of FIG. 2, the body 50 of the air bag 14 moves away from the inflator 12 toward the driver of the vehicle. The mouth 52 of the air bag 14 is retained on the reaction plate 26 with the inflator 12. Specifically, the mouth 52 of the air bag 14 is clamped between the reaction plate 26 and a retainer structure 60.

Figure 4:
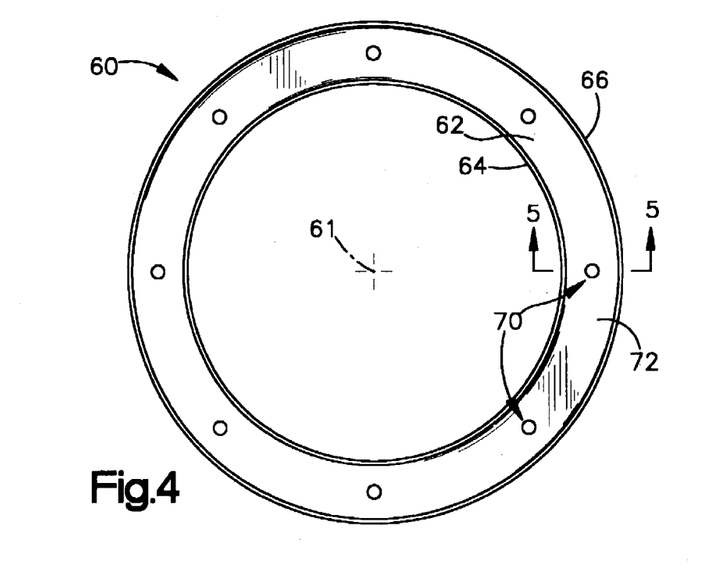
FIG. 4 is a top view of a part of the apparatus of FIG. 1.
Figure 5:
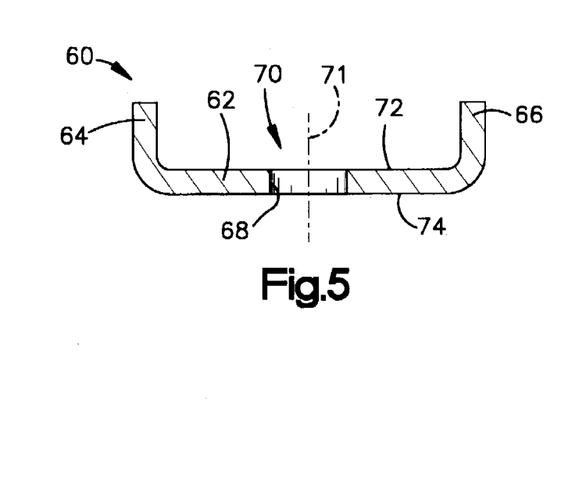
FIG. 5 is a view taken on line 5—5 of FIG. 4.

The retainer structure 60 in the first embodiment of the present invention is a circular ring with a central axis 61, as shown in FIG. 4. As shown in FIG. 5, the retainer structure 60 has a channel-shaped radial cross-section. The retainer structure 60 thus has a major portion 62 extending radially between a pair of axially projecting rim portions 64 and 66. A plurality of cylindrical inner surfaces 68 of the major portion 62 define a corresponding plurality of apertures 70 with central axes 71. The apertures 70 extend through the major portion 62 between a pair of planar, axially opposite side surfaces 72 and 74.

Figure 6:
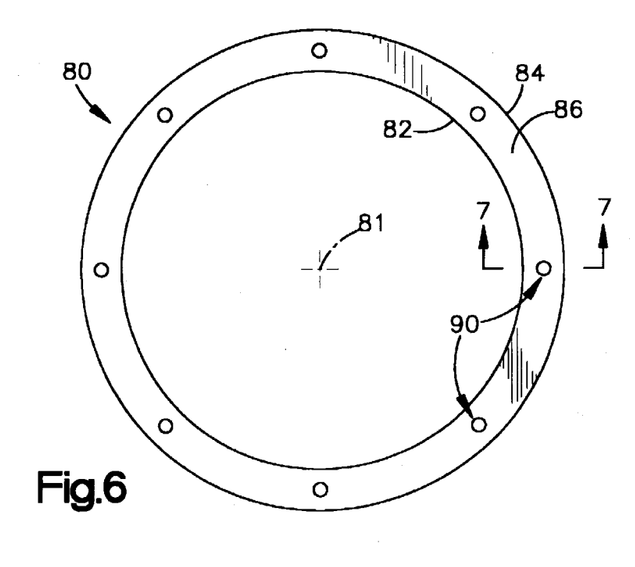
FIG. 6 is a top view of another part of the apparatus of FIG. 1.
Figure 7:
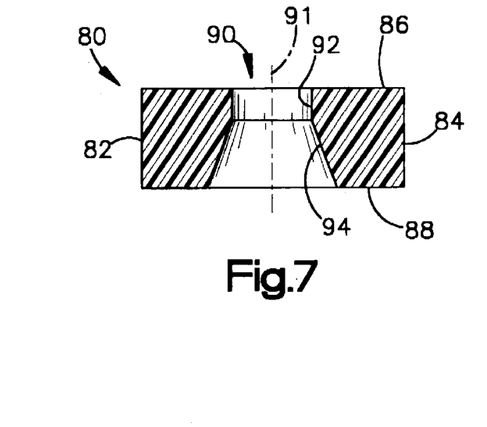
FIG. 7 is a view taken on line 7—7 of FIG. 6.

The air bag module 16 (FIGS. 1 and 2) further includes a deflectable structure 80. In the first embodiment of the present invention, the deflectable structure 80 is a cushion and is formed of an elastomeric material. The cushion 80 is used with the retainer structure 60 to retain the mouth 52 of the air bag 14 on the reaction plate 26. As shown in FIG. 6, the cushion 80 also is shaped as a ring with a central axis 81. The radial cross-section (FIG. 7) of the cushion 80 has a rectangular peripheral shape defined by a pair of cylindrical, radially opposite side surfaces 82 and 84 and a pair of planar, axially opposite side surfaces 86 and 88.

A plurality of apertures 90 extend through the cushion 80 between the axially opposite side surfaces 86 and 88. Each aperture 90 has a central axis 91, and is preferably defined by a corresponding pair of first and second inner surfaces 92 and 94. The first inner surfaces 92 have cylindrical shapes centered on the axes 91, and extend axially downward, as viewed in FIG. 7, from the upper side surface 86 to the second inner surfaces 94. The second inner surfaces 94 have frusto-conical shapes centered on the axes 91, and are tapered radially outward from the first inner surfaces 92 to the lower side surface 88.

As shown schematically in FIG. 1, the retainer structure 60 and the cushion 80 are coaxial with each other and with the inflator housing 22. As shown in greater detail in FIG. 8, the retainer structure 60 overlies the cushion 80, and is fixed to the cushion 80 by a bond 98. The bond 98 is preferably formed in a molding process in which the retainer structure 60 is placed in a mold cavity. The elastomeric material of the cushion 80 becomes fixed to the retainer structure 60 upon formation of the cushion 80 in the mold cavity adjacent to the retainer structure 60. Alternatively, the bond 98 could be formed in any other suitable manner, such as by the use of an adhesive.

Figure 8:
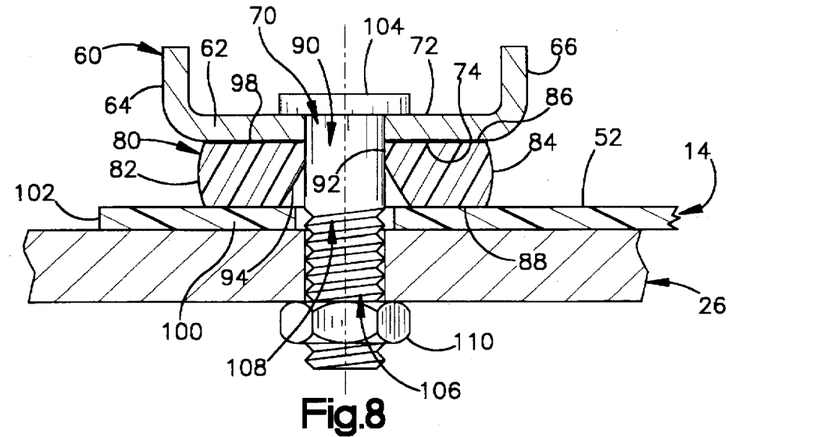
FIG. 8 is an enlarged partial view of the apparatus of FIG. 1 showing parts in greater detail.

The mouth 52 of the air bag 14 has an edge portion 100 (FIG. 8). The edge portion 100 lies upon the reaction plate 26, and extends radially over the reaction plate 26 past the retainer structure 60 and the cushion 80. An inner edge surface 102 of the edge portion 100 extends entirely around the inflator housing 22 (FIG. 1).

The apertures 70 in the retainer structure 60 are aligned with the apertures 90 in the cushion 80. A plurality of threaded fasteners 104 are received through the aligned apertures 70 and 90, and further through aligned apertures 106 and 108 in the reaction plate 26 and the edge portion 100 of the air bag 14. A corresponding plurality of nuts 110 are tightened onto the fasteners 104. When the nuts 110 are being tightened onto the fasteners 104, the retainer structure 60 is drawn downward, as viewed in the drawings, toward the reaction plate 26. The retainer structure 60 then presses the cushion 80 and the edge portion 100 of the air bag 14 against the reaction plate 26 with an axially directed clamping force.

The clamping force causes the cushion 80 to compress between its axially opposite side surfaces 86 and 88, and to bulge at its radially opposite side surfaces 82 and 84. The cushion 80 remains compressively loaded and deformed by the clamping force in this manner. The cushion 80 is thus interposed between the retainer structure 60 and the reaction plate 26 as a seal which blocks the passage of inflation fluid radially outward between those parts. Specifically, the cushion 80 blocks the passage of inflation fluid radially outward between the retainer structure 60 and the edge portion 100 of the air bag 14. The cushion 80 also holds the edge portion 100 of the air bag 14 against the reaction plate 26 firmly enough to prevent inflation fluid from passing radially outward between the edge portion 100 and the reaction plate 26.

In the first embodiment of the present invention, the cushion 80 is fixed to the retainer structure 60 by the bond 98. If the cushion 80 were not fixed to the retainer structure 60 by the bond 98, the clamping pressure between the upper side surface 86 of the cushion 80 and the lower side surface 74 of the retainer structure 60 would be great enough for the cushion 80 to provide a seal at that location also.

As described above with reference to FIGS. 1 and 2, an inflation fluid pressure force acts against the air bag 14 to move it outward from the cover 40 (FIGS. 1 and 2) toward the driver of the vehicle when the air bag 14 is being inflated. The pressure force urges the edge portion 100 of the air bag 14 to move radially outward between the retainer structure 60 and the reaction plate 26. This is indicated schematically by the arrow shown in FIG. 9.

The edge portion 100 of the air bag 14 transmits a component of the inflation fluid pressure force to the cushion 80. This induces stress in the cushion 80 which causes it to deflect radially outward from the condition of FIG. 8 to the condition of FIG. 9. Such deflection of the cushion 80 enables the edge portion 100 of the air bag 14 to move a corresponding distance radially outward under the influence of the pressure force. In this manner, the pressure force acts through a distance such that work is performed and energy is dissipated. The dissipation of energy relieves the stress induced in the material of which the air bag 14 is formed. The cushion 80 thus helps to ensure that the air bag 14, and particularly the edge portion 100, is not torn or otherwise damaged by the inflation fluid pressure force when the air bag 14 is being inflated.

Figure 9:
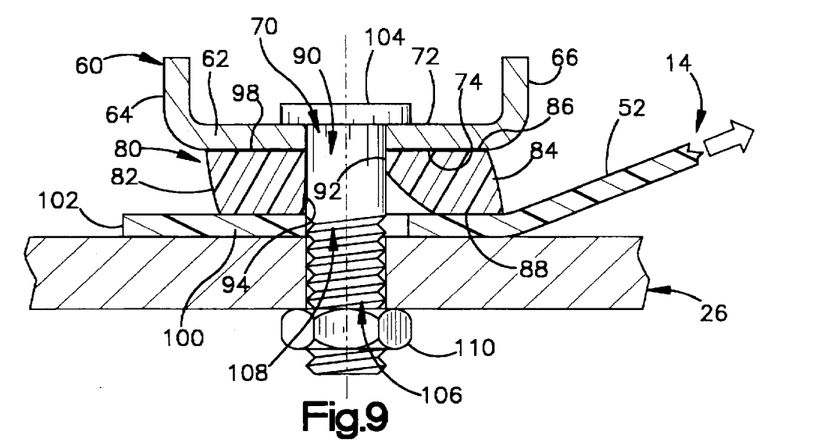
FIG. 9 is a view similar to FIG. 8 showing parts in different positions.
Figure 10:
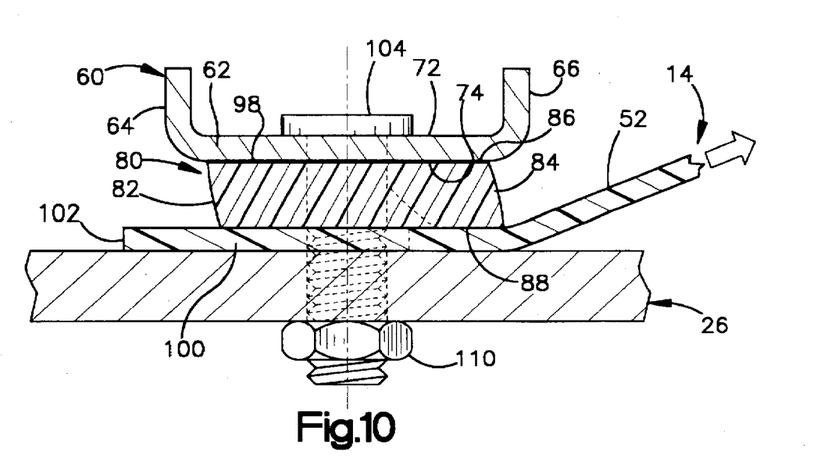
FIG. 10 also is a view similar to FIG. 8 showing parts in different positions.

An optional feature of the present invention is provided by the partially conical shapes of the apertures 90 in the cushion 80. As described above, the second inner surfaces 94 of the cushion 80 are tapered radially outward from the fasteners 104. Those surfaces 94 move toward and against the fasteners 104 when the cushion 80 deflects to the condition of FIG. 9. The apertures 90 thus provide clearance for the cushion 80 to deflect adjacent to the fasteners 104, as shown in FIG. 9, in the same amount that it deflects along its length between the fasteners 104, as shown in FIG. 10.

Figure 11:
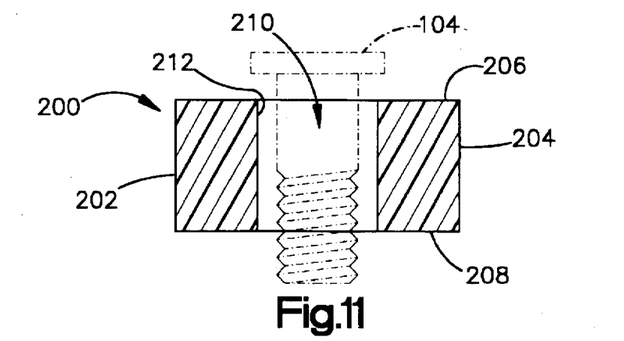
FIG. 11 is a view somewhat similar to FIG. 8 showing parts of an apparatus comprising a second embodiment of the present invention.

In a second embodiment of the present invention, the vehicle occupant protection apparatus 10 of FIGS. 1 and 2 includes an alternative deflectable structure in the form of an elastomeric cushion 200 (FIG. 11). The view of the cushion 200 shown in FIG. 11 is a radial cross-section corresponding with the radial cross-section of the cushion 80 shown in FIG. 8. Like the cushion 80, the cushion 200 has a pair of cylindrical, radially opposite side surfaces 202 and 204, and further has a pair of planar, axially opposite side surfaces 206 and 208.

Unlike the cushion 80, the cushion 200 has apertures 210 which are defined entirely by cylindrical inner surfaces 212. The fasteners 104 are receivable through the apertures 210. The apertures 210 have constant diameters that are preferably greater than the diameters of the fasteners 104. The inner surfaces 212 are thus spaced fully from the fasteners 104 along their entire lengths, and are movable toward and against the fasteners 104 upon deflection of the cushion 200 in the manner described above with reference to deflection of the cushion 80.

Figure 12:
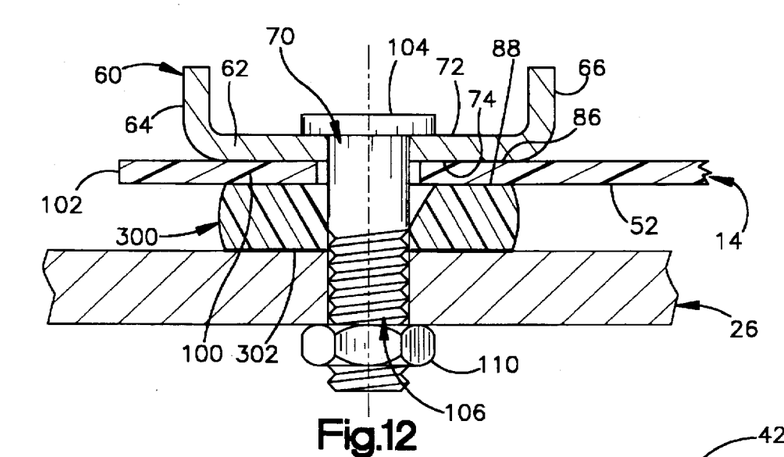
FIG. 12 is a view similar to FIG. 8 showing parts of an apparatus comprising a third embodiment of the present invention.

A third embodiment of the present invention is shown partially in FIG. 12. The partial view of the third embodiment shown in FIG. 12 corresponds with the partial view of the first embodiment shown in FIG. 8. As indicated by the use of the same reference numbers in FIGS. 12 and 8, the third embodiment has several parts that are substantially the same as corresponding parts of the first embodiment. Such parts include a reaction plate 26, a retainer structure 60, and an air bag 14 with an edge portion 100 having an inner edge surface 102. The third embodiment further includes an alternative deflectable structure in the form of an elastomeric cushion 300.

The cushion 300 of FIG. 12 is inverted axially, as compared with the cushion 80 of FIG. 8, and is located axially between the reaction plate 26 and the edge portion 100 of the air bag 14. Preferably, a bond 302 like the bond 98 fixes the cushion 300 to the reaction plate 26. The cushion 300 is otherwise the same as the cushion 80, and functions as a deflectable seal in the manner described above with reference to the cushion 80.

Figure 13:
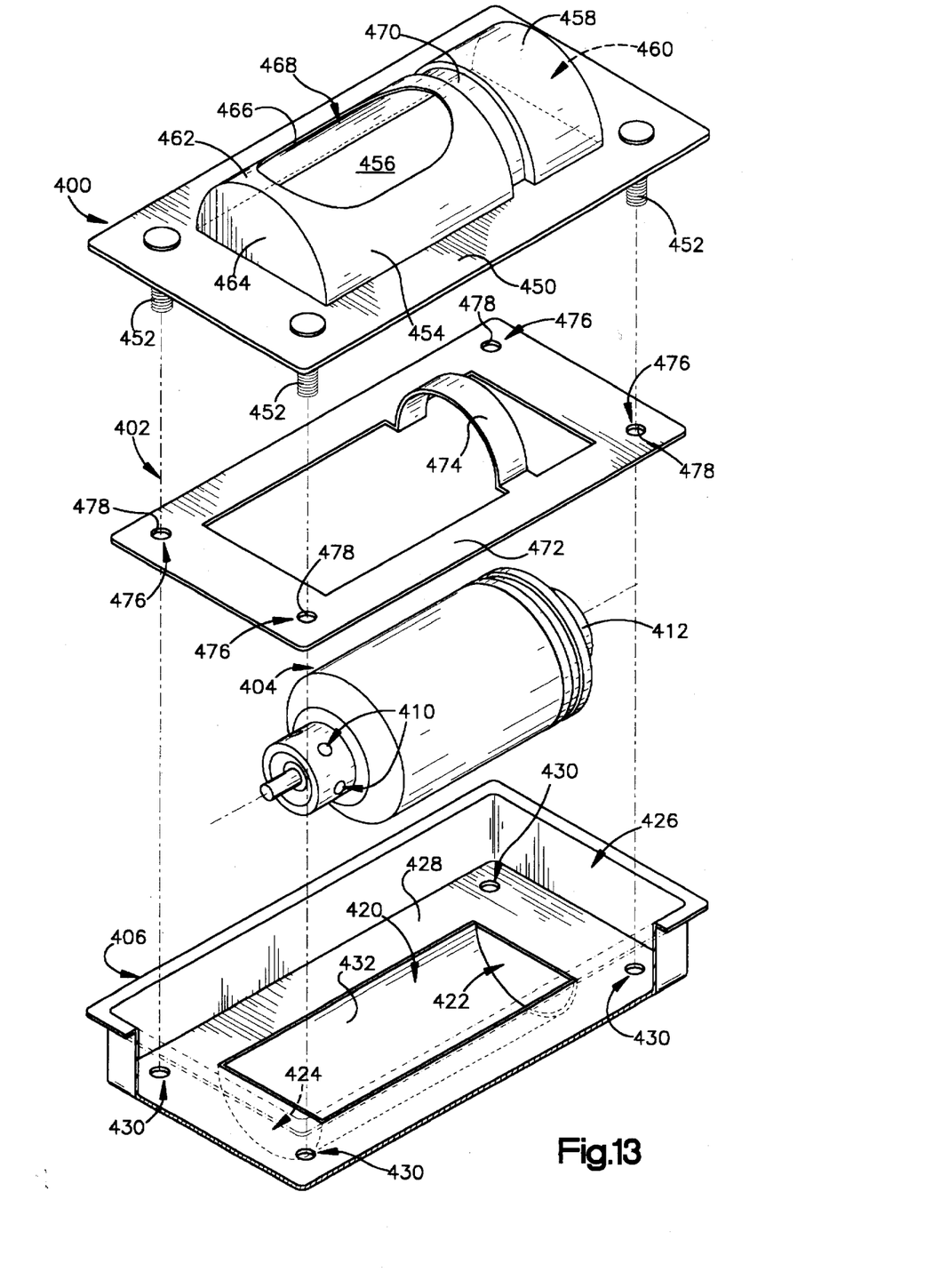
FIG. 13 is an exploded perspective view of parts of an apparatus comprising a fourth embodiment of the present invention.
Figure 14:
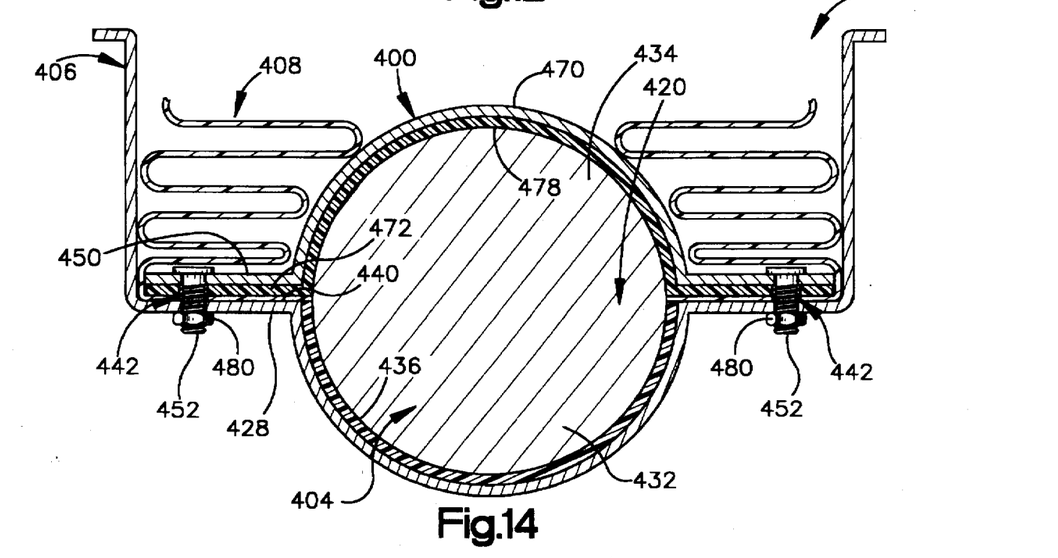
FIG. 14 is a sectional view showing parts of the fourth embodiment in an interconnected relationship.

Parts of a fourth embodiment of the present invention are shown in FIG. 13. These include a retainer structure 400, a deflectable structure in the form of an elastomeric cushion 402, an inflator 404, and a reaction canister 406. The fourth embodiment further includes an air bag 408 (FIG. 14).

The inflator 404 is a known part. As compared with the inflator 12 described above, the inflator 404 has a longer cylindrical shape, and is oriented horizontally rather than vertically. A plurality of inflation fluid outlet openings 410 are arranged in a circumferentially extending array at one end of the inflator 404. An electrically actuatable initiator 412 is located at the opposite end of the inflator 404.

The reaction canister 406 has a trough-shaped recess 420 for receiving the inflator 404. The recess 420 has an open end 422 and a closed end 424. The reaction canister 406 further has a rectangular compartment 426 for receiving the air bag 408. A horizontal base wall 428 of the reaction canister 406 is shaped as a rectangular frame surrounding the recess 420, and defines the bottom of the compartment 426. Four apertures 430 extend through the base wall 428, with each aperture 430 being located near a corresponding corner of the base wall 428.

When the inflator 404 is received in the recess 420 in the reaction canister 406, the outlet openings 410 are located adjacent to the closed end 424 of the recess 420, and the initiator 412 is located adjacent to the open end 422 of the recess 420. The open end 422 provides access for connection of the initiator 412 in an electrical circuit like the electrical circuit 30 of FIG. 3. As shown in FIG. 14, a lower half 432 of the inflator 404 fits within the recess 420. An upper half 434 of the inflator projects from the recess 420 into the compartment 426.

Preferably, an elastomeric liner 436 is first received in the recess 420. The liner 436 functions as a seal which takes up manufacturing tolerances between the inflator 404 and the reaction canister 406 within the recess 420.

The air bag 408 is received in the compartment 426 in the reaction canister 406 in the folded, uninflated condition in which it is shown schematically in FIG. 14. An edge portion 440 of the air bag 408 lies upon the base wall 428 of the reaction canister 406. Like the base wall 428, the edge portion 440 of the air bag 408 is shaped as a rectangular frame extending entirely around the recess 420 and the inflator 404. Four apertures 442, two of which are shown in FIG. 14, extend through the edge portion 440 of the air bag 408 at locations corresponding to the locations of the apertures 430 in the base wall 428.

The retainer structure 400 encloses the air bag 408 and the inflator 404 within the reaction canister 406. A planar base wall 450 of the retainer structure 400 has a size and shape closely matching the size and shape of the base wall 428 of the reaction canister 406. Four threaded fasteners 452 project from the base wall 450 at locations corresponding to the locations of the apertures 430 in the base wall 428.

An arcuate portion 454 of the retainer structure 400 defines a chamber 456 for receiving the upper half 434 of the inflator 404. A first section 458 of the arcuate portion 454 defines an open end 460 of the chamber 456. A second, longer section 462 defines a closed end 464 of the chamber 456. The second section 462 has an edge surface 466 defining an inflation fluid outlet opening 468. A third section 470 of the arcuate portion 454 is located between the first and second sections 458 and 462, and is recessed radially from the first and second sections 458 and 462. The third section 470 is shaped as a narrow band extending in an arc around the chamber 456 between opposite sides of the frame-shaped base wall 450.

The cushion 402 has a base 472 with substantially the same size and shape as the base wall 450 of the retainer structure 400. An arcuate section 474 of the cushion 402 has substantially the same size and shape as the arcuate section 470 of the retainer structure 400, and has the same location relative to the corresponding base 472. Four apertures 476 extend through the base 472 of the cushion 402 at locations corresponding to the locations of the fasteners 452. The apertures 476 have the same size and shape as the apertures 210 described above with reference to FIG. 11. The apertures 476 are thus defined entirely by cylindrical inner surfaces 478 of the cushion 402, and have constant diameters that are greater than the diameters of the fasteners 452. Alternatively, the apertures 476 could have constant diameters that are equal to the diameters of the fasteners 452, or could have other shapes, such as the shapes of the apertures 90 shown in FIG. 8.

The foregoing parts of the fourth embodiment are interconnected as shown in FIG. 14. The base 472 of the cushion 402 overlies the edge portion 440 of the air bag 408 entirely around the recess 420 and the inflator 404. The base wall 450 of the retainer structure 400, in turn, overlies the base 472 of the cushion 402 fully around the recess 420 and the inflator 404. The arcuate section 474 of the cushion 402 extends approximately half-way around the inflator 404 in overlying contact with the inflator 404. The arcuate section 470 of the retainer structure 400 overlies the arcuate section 474 of the cushion 402 fully between the opposite sides of the base wall 450.

The fasteners 452 extend through the apertures 476, 442, and 430 in the cushion 402, the air bag 408, and the reaction canister 406, respectively. When a plurality of nuts 480 are tightened onto the fasteners 452, the retainer structure 400 is drawn downward, as viewed in the drawings, within the compartment 426 in the reaction canister 406. The base wall 450 of the retainer structure 400 presses the base 472 of the cushion 402 and the edge portion 440 of the air bag 408 against the base wall 428 of the reaction canister 406 with a clamping force. The arcuate section 470 of the retainer structure 400 presses the arcuate section 474 of the cushion 402 against the inflator 404 with the same clamping force.

When the inflator 404 is actuated, inflation fluid is emitted from the outlet openings 410. The inflation fluid flows outward from the chamber 456 to the air bag 408 through the outlet opening 468 in the retainer structure 400. An inflation fluid pressure force acts against the air bag 408 and urges the edge portion 440 to move outward between the base wall 450 of the retainer structure 400 and the base wall 428 of the reaction canister 406. The base 472 of the cushion 402 then functions as a deflectable seal in the same manner described above with reference to the cushion 80 in the first embodiment of the present invention. The base 472 of the cushion thus helps to ensure that the edge portion 440 of the air bag 408 is not damaged by the inflation fluid pressure force. Additionally, the arcuate section 474 of the cushion 402 functions as a seal between the retainer structure 400 and the inflator 404 to block the inflation fluid from flowing outward through the open end 460 of the chamber 456 and the open end 422 of the recess 420.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a retainer structure;
   a reaction structure;
   an inflatable vehicle occupant protection device having a portion clamped between said retainer structure and said reaction structure; and
   means for deflecting under the influence of an inflation fluid pressure force to enable limited movement of said portion of said protection device between said retainer structure and said reaction structure under the influence of said force.

2. Apparatus as defined in claim 1 wherein said means for deflecting extends between said retainer structure and said reaction structure.

3. Apparatus as defined in claim 1 wherein said means for deflecting comprises a deflectable cushion.

4. Apparatus as defined in claim 3 wherein said cushion is formed of an elastomeric material.

5. Apparatus comprising:
   a retainer structure;
   a reaction structure;
   an inflatable vehicle occupant protection device having a portion clamped between said retainer structure and said reaction structure;
   a cushion adjoining said portion of said protection device between said retainer structure and said reaction structure, said cushion being deflectable under the influence of an inflation fluid pressure force to enable limited movement of said portion of said protection device between said retainer structure and said reaction structure under the influence of said force; and a plurality of fasteners extending from said retainer structure to said reaction structure through apertures in said cushion, said apertures being defined at least in part by surface portions of said cushion which are movable toward said fasteners under the influence of said force.

6. Apparatus as defined in claim 5 wherein said surface portions of said cushion are tapered away from said fasteners.

7. Apparatus as defined in claim 5 wherein said surface portions of said cushion are spaced fully from said fasteners.

8. Apparatus comprising:

a retainer structure;

a reaction structure;

an inflatable vehicle occupant protection device having a portion clamped between said retainer structure and said reaction structure;

a cushion adjoining said portion of said protection device between said retainer structure and said reaction structure, said cushion comprising means for deflecting under the influence of an inflation fluid pressure force to enable limited movement of said portion of said protection device between said retainer structure and said reaction structure under the influence of said force; and an inflator containing a source of inflation fluid, said cushion having a sealing portion clamped between said retainer structure and said inflator;

said means for deflecting comprising a planar portion of said cushion which is shaped as a rectangular frame surrounding said inflator, said sealing portion of said cushion having an arcuate shape extending partially around said inflator between opposite sides of said rectangular frame.

9. Apparatus comprising:

a retainer structure;

a reaction structure;

an inflatable vehicle occupant protection device having a portion clamped between a pair of opposed surfaces of said retainer structure and said reaction structure in contact with one of said opposed surfaces; and a cushion clamped between said portion of said protection device and the other of said opposed surfaces, said cushion being deflectable under the influence of an inflation fluid pressure force to enable limited movement of said portion of said protection device in sliding contact with said one of said opposed surfaces under the influence of said force.

10. Apparatus as defined in claim 9 further comprising a plurality of fasteners extending from said retainer structure to said reaction structure through apertures in said cushion, said apertures being defined at least in part by surface portions of said cushion which are movable toward said fasteners under the influence of said force.

11. Apparatus as defined in claim 10 wherein said surface portions of said cushion are tapered away from said fasteners.

12. Apparatus as defined in claim 10 wherein said surface portions of said cushion are spaced fully from said fasteners.

13. Apparatus as defined in claim 9 wherein said cushion is bonded to said other of said opposed surfaces.

* * * * *